Patented Aug. 4, 1953

2,647,917

UNITED STATES PATENT OFFICE 2,647,917

PROCESS OF PREPARING DIETHYL BENZOYLSUCCINATE

Tracy M. Patrick, Jr., Dayton, and Earl W. Gluesenkamp, Centerville, Ohio, assignors to Monsanto Chemical Company, St. Louis, Mo., a corporation of Delaware No Drawing. Application June 23, 1950, Serial No. 170,048

1 Claim. (Cl. 260—475)

This invention relates to a novel process for the preparation of aromatic oxoesters and mixtures thereof.

The copending application of Tracy M. Patrick, Jr. and Earl W. Gluesenkamp, Serial No. 135,829, filed December 29, 1949, now abandoned, relates to the free radical induced reaction of a saturated aldehyde selected from the group consisting of 2- to 18-carbon atom aliphatic, alicyclic and heterocyclic aldehydes with a 4- to 6-carbon atom ethylenic unsaturated polycarboxylic acid and alkyl esters thereof.

It has now been found that aromatic oxoesters can be prepared by reacting a 7- to 13-carbon atom aromatic aldehyde with esters, partial esters and mixed esters of a 4- to 6-carbon atom ethylenic unsaturated polycarboxylic acid, wherein the ethylenic bond is conjugated with at least one of the carbonyl groups and the 1- to 20-carbon atom ester radical is selected from the group consisting of alkyl, aryl, aralkyl and cycloalkyl radicals, in the presence of a free radical promoting agent.

The aromatic oxoesters of this invention can be diagrammatically represented by the structural formula

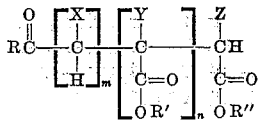

wherein X is selected from the group consisting of —H, —COOR''' and —CH$_2$COOR$^{iv}$; $m$ is an integer from 0 to 1; Y and Z are selected from the group consisting of —H and —CH$_3$; $n$ is an integer from 0 to 1; the sum of $m$ plus $n$ is an integer from 1 to 2; R is a 6- to 12-carbon atom aromatic radical; R', R'', R''' and R$^{iv}$ are 1- to 20-carbon atom saturated hydrocarbon radicals selected from the group consisting of alkyl, aryl, aralkyl and cycloalkyl radicals, R'' and R$^{iv}$ can also be —H, R' can be —H when $m$ equals 1; and at least one of said R', R'', R''' and R$^{iv}$ groups is a saturated hydrocarbon radical.

The aromatic aldehydes which can be employed in this invention are, for example, benzaldehyde, p-tolualdehyde, mesitaldehyde, α-naphthaldehyde, β-naphthaldehyde, phenyl acetaldehyde, formylbiphenyl and the like.

Esters, partial esters and mixed esters of 4- to 6-carbon atom ethylenic unsaturated polycarboxylic acids, as for example, maleic acid, fumaric acid, citraconic acid, mesaconic acid, itaconic acid, aconitic acid, glutaconic acid and the like, an be employed. Thus, the mono-, di- and tri-esters are within the scope of this invention. These 1- to 20-carbon atom saturated hydrocarbon ester radicals can be selected from the group consisting of alkyl, aryl, aralkyl and cycloalkyl radicals, as for example, methyl, ethyl, propyl, butyl, amyl, hexyl, 2-ethylhexyl, octyl, dodecyl, octadecyl, phenyl, tolyl, xylyl, mesityl, cumyl, biphenylyl, naphthyl, benzyl, phenethyl, cyclopropyl, cyclohexyl, bicyclohexyl, tetrahydronaphthyl, decahydronaphthyl, tetrahydroabietyl, dehydroabietyl and the like and mixtures thereof. It is thus seen that by the term "saturated hydrocarbon radical" the conventional exception is made for normal benzene-ring type unsaturation.

When the aromatic aldehyde reacts with an unsaturated polycarboxylic acid or partial ester such that the carbon atom with which the acyl group forms a new carbon-carbon bond also has a carboxyl radical attached thereto the compound so formed is in general unstable, evolving carbon dioxide from the carboxyl radical. When the carboxyl group is esterified, prior to the reaction with the aldehyde, decarboxylation does not occur. Thus, in the process of this invention the substantially completely esterified acids are preferably employed.

It will be seen that the above range of variables encompasses compounds having molecular weights from about 192 to 1200. In general, however, it is preferable that the R groups are not simultaneously at the maximum, thus compounds with a molecular weight of up to about 800 are preferred and substantially completely esterified compounds having a molecular weight of from about 250 to about 450 are more specifically preferred.

The free radical promoting agents are, for example, acetyl peroxide, benzoyl peroxide, lauroyl peroxide, hydrogen peroxide, peracetic acid, sodium perborate, ultraviolet radiation and the like. The free radical promoting catalyst is generally employed at from about 0.1 to about 5 mole per cent and preferably from about 0.25 to about 2 mole per cent based on the esterified 4- to 6-carbon atom ethylenic unsaturated polycarboxylic acid and the catalyst can be added all at once, in increments or continuously over a period of time.

It might be expected that any unsaturated polymerizable monomer could readily be reacted with an aldehyde to produce an oxoester. This, however, is not the case since monomers which polymerize relatively easily to the polymer will tend to do so thus producing a high molecular weight resin with little or no reaction with the aldehyde to form a ketone. Thus, the reaction is in general limited to those unsaturated compounds which cannot be readily polymerized alone.

Polycarboxylic acid anhydrides, as for example, maleic anhydride and itaconic anhydride are employed in many compositions to provide heteropolymers with the above type reactive monomers, as for example styrene and vinyl acetate. Maleic acid and esters thereof can also form heteropolymers with the above reactive monomers, however they are less reactive than the anhydride which is generally preferred. It has now surprisingly been found that 4- to 6- carbon atom ethylenic unsaturated polycarboxylic acid anhydrides such as maleic and itaconic anhydride are not reactive with aldehydes in the presence of a free radical promoting agent, whereas the free acid and esters thereof are reactive. Thus, reactions of this nature are not readily predictable.

The following example is illustrative of the invention:

*Example*

A 43-g. sample (0.25 mole) of redistilled diethyl maleate and 106 g. (1.0 mole) of redistilled benzaldehyde were added to a 500-ml. round-bottom flask which was fitted with a reflux condenser and a thermometer, and was supported by an electric heating mantle connected through a voltage control transformer set at 20 volts. The mixture was heated to 83° C. and 0.3 g. of benzoyl peroxide was added thereto. Two further additions of 0.3 g. of benzoyl peroxide were made after 1 and 3 hours reaction time, respectively. The temperature of the reaction mixture was held at 81 to 83° C. for a total reaction time of about 22.5 hours, after which time the heating was discontinued and the amber liquid allowed to cool.

The cooled reaction mixture was extracted twice with a 5 per cent sodium hydroxide solution to remove any benzoic acid, washed well with water until the reaction mixture was neutral, dried with anhydrous sodium sulfate and filtered to recover the processed reaction mixture. During the above extraction procedure a small amount of benzene was added to the system to facilitate proper phase separation.

The processed reaction mixture was then distilled through a 10-inch Vigreux fractionating column recovering the benzene, excess benzaldehyde and some unreacted diethyl maleate. The amber liquid residue contained a small amount of crystals on cooling and was therefore diluted with benzene, extracted twice with a 5 per cent sodium hydroxide solution, washed until neutral, dried with anhydrous calcium sulfate and filtered in a similar manner to the initial treatment.

The residue was then distilled to remove the benzene and viscous yellow oily liquid fraction was obtained at 150 to 160° C./0.8 mm. having a refractive index of 1.5028 at 25° C. and a density of 1.1263.

A portion of this fraction was boiled with dilute sulfuric acid for about 15 minutes until the oil was hydrolyzed. The solution was cooled and the white crystals which formed were recovered, redissolved with a sodium hydroxide solution, reprecipitated with dilute hydrochloric acid, washed and recrystallized in hot water. The corrected melting point was found to be 117 to 118° C. which agrees with the melting point for β-benzoylpropionic acid reported in J. Chem. Soc. 101, 1231.

The identity of the oil was further confirmed to be diethyl benzoylsuccinate by elemental analysis.

Calculated for $C_{15}H_{18}O_5$: C, 64.76, H, 6.52. Found: C, 64.76; H, 6.42.

After distilling off the above product a small amount of a viscous amber liquid residue remained which is a telomeric product of benzaldehyde with diethyl maleate.

Other compounds which can be prepared by the free radical induced reaction described herein are, for example:

di-2-ethylhexyl benzoylsuccinate,
diethyl toluylsuccinate,
diethylphenylacetylsuccinate,
tributyl α-benzoyltricarballylate,
dioctadecyl benzoylsuccinate,
diphenyl benzoylsuccinate,
dibenzyl benzoylsuccinate,
dicyclohexyl benzoylsuccinate.

In general it is preferable to have a molar excess of aldehyde present during the reaction; thus, the molar ratio of aldehyde to ester can be from about 2 to about 5. This procedure also tends to reduce the amount of telomer formation. The excess aldehyde can be recovered by fractional distillation of the reaction mixture or by the preparation of the bisulfite addition product in neutral solution with subsequent extraction and regeneration of the aldehyde. For the higher molecular weight products fractional molecular distillation is necessary to effect separation without decomposition where the relatively pure oxoester is desired. In general, however, the excess aldehyde can be removed and a relatively small amount of an unreacted high molecular weight ester of an unsaturated polycarboxylic acid, which would be difficult or impossible to remove by normal distillation is not detrimental for many applications. Thus, the oxoester products of high molecular weight can be a mixture consisting substantially of the desired product with small amounts of unreacted ester and telomers as impurities therein.

The oxoesters of this invention can be employed as chemical intermediates, plasticizers and modifiers in coating, plastic and solvent formulations.

We claim:

The process of preparing diethyl benzoylsuccinate comprising the reaction of from about 2 to about 5 moles of benzaldehyde with one mole of diethyl maleate in the presence of the free radical promoting agent, benzoyl peroxide.

TRACY M. PATRICK, Jr.
EARL W. GLUESENKAMP.

References Cited in the file of this patent

UNITED STATES PATENTS

| Number | Name | Date |
| --- | --- | --- |
| 2,332,896 | D'Alelio | Oct. 26, 1943 |
| 2,332,897 | D'Alelio | Oct. 26, 1943 |
| 2,332,900 | D'Alelio | Oct. 26, 1943 |
| 2,334,545 | D'Alelio | Nov. 11, 1943 |
| 2,373,548 | D'Alelio | Apr. 16, 1945 |

OTHER REFERENCES

Robinson, Jour. Chem. Soc. (1933), pp. 1469–1472.